United States Patent
Dvoskin et al.

(10) Patent No.: US 7,568,370 B2
(45) Date of Patent: Aug. 4, 2009

(54) SYSTEM AND METHOD FOR BALLIZING AND MEASURING A WORKPIECE BORE HOLE

(75) Inventors: Lev M. Dvoskin, San Jose, CA (US); Gunter K. Heine, Aptos, CA (US); Edelgard Heine, legal representative, Aptos, CA (US); Roger A. Addy, Gilroy, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 328 days.

(21) Appl. No.: 11/601,291

(22) Filed: Nov. 17, 2006

(65) Prior Publication Data

US 2007/0067976 A1 Mar. 29, 2007

Related U.S. Application Data

(62) Division of application No. 10/703,689, filed on Nov. 7, 2003, now Pat. No. 7,210,209.

(60) Provisional application No. 60/441,683, filed on Jan. 21, 2003.

(51) Int. Cl.
*B21D 17/04* (2006.01)
(52) U.S. Cl. .................................. 72/75; 72/10.4
(58) Field of Classification Search ................. 72/10.4, 72/14.4, 21.4, 75, 479; 29/90.01, 407.08
See application file for complete search history.

(56) References Cited

U.S. PATENT DOCUMENTS

| 1,360,558 | A | 11/1920 | Mattsson |
| 3,196,653 | A | 7/1965 | Gazan |
| 3,587,269 | A | 6/1971 | Seccombe et al. |
| 3,691,805 | A | 9/1972 | Gresham et al. |
| 4,005,591 | A | 2/1977 | Werner |
| 4,129,028 | A | 12/1978 | Leftheris et al. |
| 4,360,161 | A | 11/1982 | Claxton et al. |

(Continued)

FOREIGN PATENT DOCUMENTS

EP 041248 A2 * 5/1981

(Continued)

OTHER PUBLICATIONS

International Search Report mailed in Jun. 25, 2004 for PCT patent application No. PCT/US2004/001650, filed Jan. 21, 2004, 5 pages.

(Continued)

*Primary Examiner*—Edward Tolan
(74) *Attorney, Agent, or Firm*—Michael S. Garrabrants; Novak Druce + Quigg LLP (57) ABSTRACT

A system and method are described for ballizing and measuring a workpiece bore hole. In one embodiment, a ballizing unit having a distal end removably coupled to a ballizing member moves the ballizing member from a first position within the bore hole to a second position. A metrology unit having a distal end removably coupled to the ballizing member moves the ballizing member from the second position back to the first position. A sensor detects a force exerted on the ballizing member by the workpiece at a third position, which is located between the first and second positions.

9 Claims, 6 Drawing Sheets

U.S. PATENT DOCUMENTS

| | | |
|---|---|---|
| 4,835,832 A | 6/1989 | Arnold et al. |
| 4,841,627 A | 6/1989 | Arnold et al. |
| 5,247,819 A | 9/1993 | Morimoto et al. |
| 5,311,662 A | 5/1994 | Losser |
| 5,339,523 A | 8/1994 | Hasegawa |
| 5,343,618 A | 9/1994 | Arnold et al. |
| 5,524,464 A | 6/1996 | Asada et al. |
| 5,544,514 A * | 8/1996 | Maier et al. .................. 72/75 |
| 5,651,720 A * | 7/1997 | Shinomoto et al. ............ 451/8 |
| 5,797,303 A | 8/1998 | Asada et al. |
| 6,622,570 B1 * | 9/2003 | Prevey, III .................. 73/826 |
| 6,691,410 B2 | 2/2004 | Bucey et al. |
| 7,210,209 B2 * | 5/2007 | Dvoskin et al. .......... 29/407.08 |

FOREIGN PATENT DOCUMENTS

| | | |
|---|---|---|
| EP | 0 451 935 | 10/1991 |
| EP | 0 538 790 | 4/1993 |
| JP | 5-38672 * | 2/1993 |
| JP | 07246436 A | 9/1995 |
| JP | 2003205456 A | 7/2003 |
| WO | WO 2004065895 A1 | 8/2004 |

OTHER PUBLICATIONS

English on-line translation of JP 07246436A.
The Latest Technology in Hole Finishing: Ballizing by Sid Grodsky, Carbide and Tool Journal, v. 20(6), Nov.-Dec. 1988. p. 24-30.

* cited by examiner

SYSTEM AND METHOD FOR BALLIZING AND MEASURING A WORKPIECE BORE HOLE

CROSS-REFERENCE TO RELATED APPLICATION

This application is a Divisional of prior application U.S. Ser. No. 10/703,689, filed Nov. 7, 2003, now U.S. Pat. No. 7,210,209 which relates to, and claims the priority benefit of, U.S. Provisional Patent Application No. 60/441,683, titled "Closed Loop Bore Sizing and Measuring System," filed on Jan. 21, 2003. The subject matter of the related applications are hereby incorporated by reference in their entirety.

BACKGROUND OF THE INVENTION

1. Field of the Invention

This invention relates generally to enlarging or finishing a workpiece bore hole and more specifically to a system and method for ballizing and measuring a workpiece bore hole.

2. Description of the Background Art

When machining a bore hole into a workpiece, one typically uses a boring machine to turn the initial bore hole. The level of precision of the bore hole dimensions (e.g., the bore hole diameter) usually relates to the level of precision of the turning process. In high precision applications, one may perform a ballizing process to enlarge the machined bore hole and/or to finish the machined bore hole to increase the accuracy of the bore hole dimensions and to provide a good surface finish. In such a process, a machine pushes a ball having a diameter that is known with a very high degree of precision through the machined bore hole. The force that the ball exerts on the workpiece as it traverses the length of the bore hole shapes the bore hole.

One drawback of the above approach to machining bore holes is that a bore machine usually is not able to produce the high quality bore form and accurate bore hole dimensions necessary for high precision applications. Another drawback is that current ballizing processes require that after a given ball is pushed through the workpiece bore hole the workpiece must be removed from the ballizing machine to be measured. Measuring typically entails cleaning the workpiece to the standards of a metrology laboratory and then sending the cleaned workpiece to the metrology laboratory for measuring. This process is time consuming and expensive. Yet another drawback is that current ballizing machines oftentimes do not have efficient ways to return the ball to the upper side of the workpiece once the machine has pushed the ball through the length of the workpiece bore hole.

SUMMARY OF THE INVENTION

One embodiment of a system for ballizing, and measuring a diameter of, a bore hole of a workpiece includes a ballizing unit that has a ballizing pusher with a distal end that may be coupled to a ballizing member. The ballizing unit is configured to move the ballizing member along an axis from a first position within the bore hole to a second position within the bore hole. The system also includes a metrology unit that has a metrology pusher with a distal end that may be coupled to the ballizing Member. The metrology unit is configured to move the ballizing member along the axis from the second position to the first position. In addition, the system has a sensor that is coupled to the metrology pusher and configured to detect a force exerted on the ballizing member by the workpiece at a third position within the bore hole. The third position is located in between the first position and the second position.

One advantage of the disclosed ballizing and measuring system is that, among other things, the system provides a cost effective way to produce workpieces with bore holes that have very precise diameters, high quality surface finishes and better shaped circumferences. Further, the high precision of the ballizing process associated with this system reduces the standard deviation associated with the bore hole diameter. Another advantage of the disclosed system is that it provides a way to measure and record the diameter of a ballized bore hole without having to remove the workpiece from the system and to send the workpiece to a metrology lab for measuring. This feature greatly reduces the time and cost associated with machining high precision bore holes in workpieces. Yet another advantage is that the disclosed system provides a simple way to return the ballizing member to the upper side of the workpiece once the ballizing member has been pushed through the length of the workpiece bore hole.

DETAILED DESCRIPTION OF THE INVENTION

Figure 1:
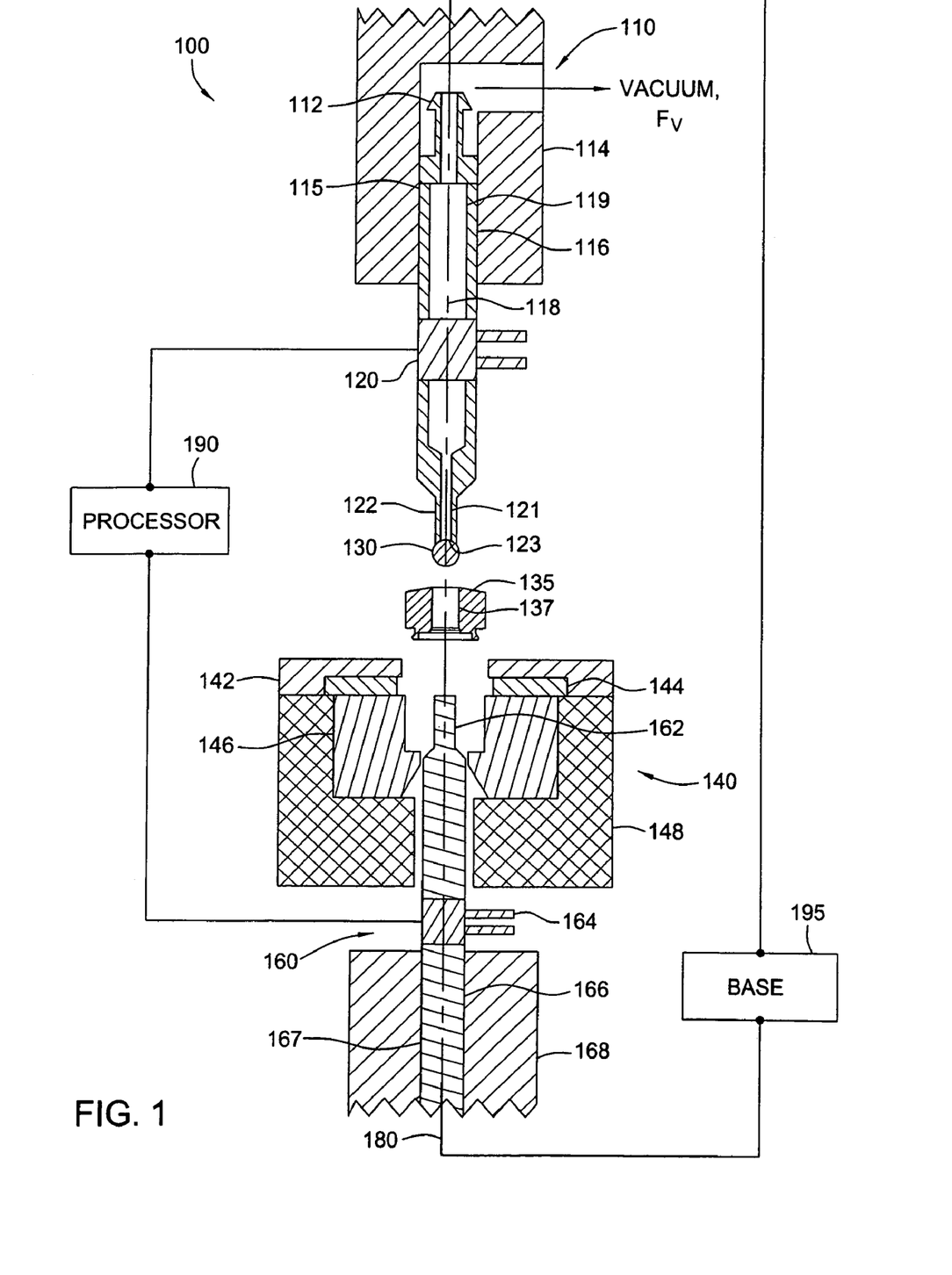
FIG. 1 is a cross-sectional view illustrating one embodiment of a system for ballizing and measuring a workpiece bore hole, according to the invention.

FIG. 1 is a cross-sectional view illustrating one embodiment of a system 100 for ballizing and measuring a workpiece bore hole 137, according to the invention. As shown, system 100 includes, without limitation, a ballizing unit 110, a ballizing member 130, a platform unit 140, a metrology unit 160, a processor 190 and a base 195. Ballizing unit 110 and metrology unit 160 are coupled to base 195 such that they move only along an axis 180 when system 100 is in operation. Platform unit 140 is coupled to base 195 such that it is stationary when system 100 is in operation.

Ballizing unit 110 is primarily responsible for pushing ballizing member 130 through workpiece bore hole 137 to increase the diameter of workpiece bore hole 137. (Note that the act of pushing ballizing member 130 through workpiece bore hole 137 is referred throughout as "ballizing" workpiece bore hole 137.) As shown, ballizing unit 110 includes, without limitation, a vacuum connector 112, a ballizing ram 114, a ballizing pusher 116 and a sensor 120. Ballizing pusher 116 is connected to ballizing ram 114 such that ballizing pusher 116 and ballizing ram 114 move together along axis 180. In one embodiment, ballizing pusher 116 is press fit into ballizing ram 114. As is also shown, ballizing pusher 116 has a smaller diameter at a proximal end 122 and a larger diameter at a distal end 115. The diameter of proximal end 122 is sized such that proximal end 122 is able to pass through workpiece bore hole 137 during ballizing and measuring operations. In other embodiments, proximal end 122 and distal end 115 of ballizing pusher 116 may have the same diameter. Ballizing pusher 116 also contains a vacuum port 118, which extends through the entire length of ballizing pusher 116. As shown, vacuum port 118 also has a smaller diameter at a proximal end 121 and a larger diameter at a distal end 119. In other embodiments, proximal end 121 and distal end 119 of vacuum port 118 may have the same diameter, but the diameter of proximal end 122 of ballizing pusher 116 typically determines the value of the diameter of distal end 121 of vacuum port 118. A vacuum connector 112 is attached to distal end 115 of ballizing pusher 116 and couples vacuum port 118 to a vacuum (not shown).

In one embodiment, sensor 120 is attached to ballizing pusher 116 such that sensor 120 is able to move along axis 180 with ballizing pusher 116 during the ballizing and measuring processes. Sensor 120 also is coupled to processor 190 and, as described in further detail herein, is configured to detect the force exerted on ballizing member 130 by workpiece 135 as ballizing unit 110 pushes ballizing member 130 through the length of workpiece bore hole 137 during the ballizing process. Sensor 120 is further configured to transmit to processor 190 a signal derived from the force exerted on ballizing member 130. Processor 190, among other things, is configured to receive this signal from sensor 120 and, as described in further detail herein, is further configured to determine from the signal the diameter of workpiece bore hole 137.

Platform unit 140 is primarily responsible for holding workpiece 135 during the ballizing and measuring processes. As shown, platform unit 140 includes, without limitation, a clamp 142, a workpiece retainer 144, a nest 146 and an anvil 148. Nest 146 is attached to anvil 148 and is configured to hold workpiece 135 during both ballizing and measuring and to provide vertical support to workpiece 135 during ballizing. Nest 146 is further configured to allow workpiece 135 to move slightly in a radial direction (i.e., the direction along a radius drawn from the center of workpiece bore hole 137 to an outer periphery of workpiece 135) while sitting in nest 146. This slight amount of radial give allows system 100 to be self-aligning. For example, in the beginning of the ballizing process, ballizing unit 110 moves downward along axis 180 and ballizing member 130, which is secured to proximal end 122 of ballizing pusher 116 as described in further detail herein, engages the top of workpiece 135 at the opening of workpiece bore hole 137. The force that ballizing member 130 exerts on workpiece 135 upon engagement moves workpiece 135 in a radial direction such that the center of workpiece bore hole 137 aligns with axis 180 (thereby aligning workpiece bore hole 137 with ballizing unit 110 and metrology unit 160). In addition, as shown in FIG. 1, both nest 146 and anvil 148 are further configured such that metrology unit 160 may access workpiece 135 through the bottoms of nest 146 and anvil 148 during both ballizing and measuring.

Workpiece retainer 144 retains workpiece 135 within nest 146 during measuring. Workpiece retainer 144 is configured to have an "open" position and a "closed" position. When in the open position, as shown, workpiece retainer 144 is disposed only above nest 146 and anvil 148 (i.e., not above the space occupied by workpiece 135 when sitting in nest 146) such that enough clearance exists for workpiece 135 to be positioned within nest 146. When closed, workpiece retainer 144 is disposed partially above the space occupied by workpiece 135 when sitting in nest 146. In one embodiment, workpiece retainer 144 is closed when metrology unit 160 engages workpiece 135 during the measuring process, as described in more detail herein, to prevent workpiece 135 from leaving nest 146 as metrology unit 160 pushes ballizing member 130 back up through workpiece bore hole 137.

Clamp 142 is attached to anvil 148 and secures workpiece retainer 144 to platform assembly 140.

Metrology unit 160 is primarily responsible for pushing ballizing member 130 back up through workpiece bore hole 137 and collecting data used to determine the diameter of workpiece bore hole 137. As shown, metrology unit 160 includes, without limitation, a sensor 164, a metrology pusher 166 and a metrology ram 168. Metrology pusher 166 is connected to metrology ram 168 such that metrology pusher 166 and metrology ram 168 move together along axis 180. In one embodiment, metrology pusher 166 is press fit into metrology ram 168. As is also shown, metrology pusher 166 has a smaller diameter at a proximal end 162 and a larger diameter at a distal end 167. The diameter of proximal end 162 is sized such that proximal end 162 is able to pass through workpiece bore hole 137 during ballizing and measuring operations. In other embodiments, proximal end 162 and distal end 167 of metrology pusher 166 may have the same diameter.

In one embodiment, sensor 164 is attached to metrology pusher 166 such that sensor 164 is able to move along axis 180 with metrology pusher 166 during the ballizing and measuring processes. Sensor 164 also is coupled to processor 190 and, as described in further detail herein, is configured to detect the force exerted on ballizing member 130 by workpiece 135 as metrology unit 110 pushes ballizing member 130 back up through the length of workpiece bore hole 137 during the measuring process. Sensor 164 is further configured to transmit to processor 190 a signal derived from this force. Processor 190, among other things, is configured to receive this signal from sensor 164 and, as described in further detail herein, is further configured to determine from the signal the diameter of workpiece bore hole 137.

Ballizing member 130 typically is spherically shaped and manufactured such that its diameter is known with a very high degree of precision (e.g., the diameter may be known within one or two tenths of a micron). Ballizing member 130 may be comprised of any material that is harder than the material used to make workpiece 135, which in one embodiment is comprised of stainless steel. In one embodiment, ballizing member 130 comprises a tungsten carbide ball.

In one embodiment, the process of ballizing workpiece 135 begins by placing workpiece 135 in nest 146 and selecting an appropriately sized ballizing member 130 for use in the ballizing process. The selection of ballizing member 130 may be based on a variety of factors such as, for example, the size of the machined diameter of workpiece bore hole 137. As described in further detail herein, ballizing member 130 typically has a diameter slightly larger than that of workpiece bore hole 137 so that pushing ballizing member 130 through workpiece bore hole 137 causes the diameter of workpiece bore hole 137 to increase. Ballizing member 130 is then loaded into system 100, which is configured such that upon the loading of ballizing member 130 the vacuum (again, not shown) exerts a vacuum force, $F_v$, on ballizing member 130 via vacuum port 118. As described in further detail below in conjunction with-FIG. 2A, the applied vacuum force pulls ballizing member 130 securely against a bottom surface 123 of ballizing pusher 116 and continues to hold ballizing member 130 securely against bottom surface 123 during the ballizing process.

Ballizing unit 110 then moves downward along axis 180 such that ballizing member 130 engages the top of workpiece 135 at the entrance of workpiece bore hole 137. As previously described, this engagement causes the center of workpiece bore hole 137 to align with axis 180. Ballizing unit 110 continues to move downward along axis 180, forcing ballizing member 130 through the length of workpiece bore hole 137. If ballizing member 130 is sized properly, the diameter of ballizing member 130 is slightly greater than the diameter of workpiece bore hole 137. This difference in diameters causes ballizing member 130 to exert a force on workpiece 135 as ballizing unit 110 pushes ballizing member 130 through the length of workpiece bore hole 137. This force causes workpiece 135 to undergo local plastic and elastic deformation in the vicinity of workpiece bore hole 137. The diameter of workpiece bore hole 137 increases as a result of the plastic deformation. System 100 is further configured such that ballizing unit 110 stops moving downward along axis 180 once ballizing member 130 traverses the entire length of workpiece bore hole 137, thereby terminating the ballizing process.

In one embodiment, the process of measuring the diameter of workpiece bore hole 137 begins after the ballizing process has terminated. As described in more detail below in conjunction with FIG. 2B, system 100 is configured such that metrology unit 160 engages ballizing member 130 once ballizing member 130 has completely traversed the length of workpiece bore hole 137. Once metrology unit 160 has engaged ballizing member 130, the vacuum stops applying the vacuum force on ballizing member 130, and ballizing unit 110 disengages ballizing member 130. Metrology unit 160 then moves upward along axis 180, causing ballizing member 130 to engage the bottom of workpiece 135 at the entrance of workpiece bore hole 137. Again, this engagement causes the center of workpiece bore hole 137 to align with axis 180. Metrology unit 160 continues to move upward along axis 180, forcing ballizing member 130 through the length of workpiece bore hole 137. If ballizing member 130 is sized properly relative to the diameter of workpiece bore hole 137, ballizing member 130 exerts a force on workpiece 135 as metrology unit 160 pushes ballizing member 130 back up through workpiece bore hole 137. This force causes workpiece 135 to undergo local elastic deformation in the vicinity of workpiece bore hole 137 (i.e., the diameter of workpiece bore hole 137 increases elastically).

As described herein, sensor 164 is configured to detect the equal and opposite reaction force that workpiece 135 exerts on ballizing member 130 (note that the force is transferred through metrology pusher 166) and to transmit a signal to processor 190 derived from this reaction force. Experimentation has shown that the ballized diameter of workpiece bore hole 137 is a function of the reaction force exerted on ballizing member 130 by workpiece 135. Processor 190, among other things, is configured to determine the diameter of workpiece bore hole 137 using this relationship and the information contained in the signal received from sensor 164. Persons skilled in the art will recognize that sensor 164 and processor 190 may be configured to measure the diameter of bore hole 137 at any position along the length of bore hole 137.

In an alternative embodiment, the process of measuring the diameter of workpiece bore hole 137 occurs simultaneously with the ballizing process. As previously described, if ballizing member 130 is sized properly, ballizing member 130 exerts a force on workpiece 135 when ballizing unit 110 pushes ballizing member 130 through workpiece bore hole 137 during ballizing. Again, this force causes local plastic and elastic deformation of workpiece 135 in the vicinity of workpiece bore hole 137. As described herein, sensor 120 is configured to detect the equal and opposite reaction force that workpiece 135 exerts on ballizing member 130 (note that the force is transferred through ballizing pusher 116) and to transmit a signal to processor 190 derived from this reaction force. Experimentation has shown that the ballized diameter of workpiece bore hole 137 is a function of the reaction force exerted on ballizing member 130 by workpiece 135. Processor 190, among other things, is configured to determine the diameter of workpiece bore hole 137 using this relationship and the information contained in the signal received from sensor 120. Again, persons skilled in the art will recognize that sensor 120 and processor 190 may be configured to measure the diameter of bore hole 137 at any position along the length of bore hole 137.

Figure 2A:
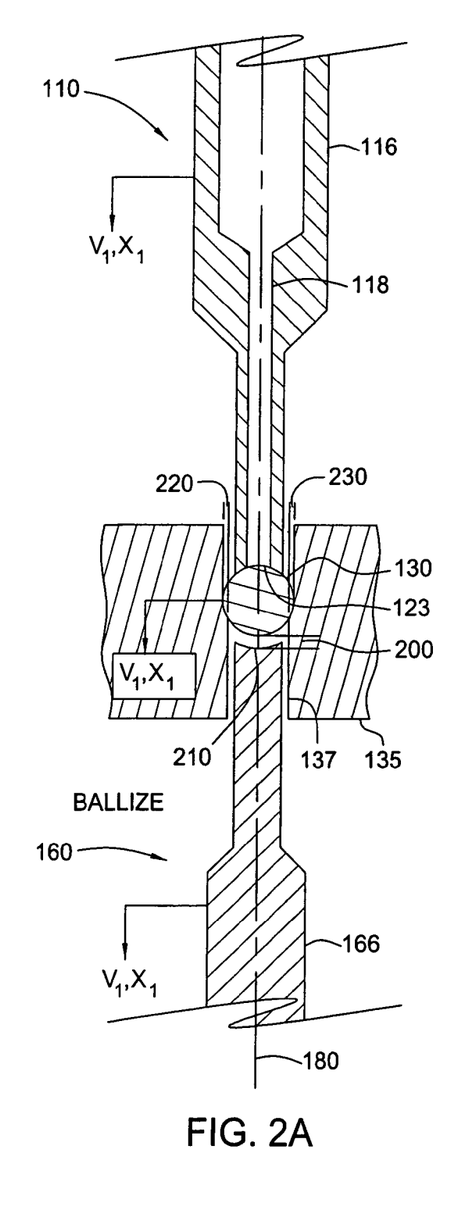
FIG. 2A is a cross-sectional view illustrating the configuration of the ballizing member, the workpiece, the ballizing pusher and the metrology pusher of FIG. 1 when ballizing the workpiece bore hole, according to one embodiment of the invention.

FIG. 2A is a cross-sectional view illustrating the configuration of ballizing member 130, workpiece 135, ballizing pusher 116 and metrology pusher 166 of FIG. 1 when ballizing workpiece bore hole 137, according to one embodiment of the invention. As shown, and as described herein, system 100 is configured such that the vacuum force, $F_v$, secures ballizing member 130 against bottom surface 123 of ballizing pusher 116 at the onset of and throughout the ballizing process. Metrology unit 160 then moves along axis 180 until a top surface 210 of metrology pusher 166 is a distance 200 from the bottom surface of ballizing member 130. Once metrology unit 160 is in place, ballizing unit 110 and metrology unit 160 move downward along axis 180 in tandem such that distance 200 is maintained between top surface 210 and the bottom surface of ballizing member 130 while ballizing unit 110 pushes ballizing member 130 through the length of workpiece bore hole 137. A consequence of this dynamic is that ballizing unit 110, ballizing member 130 and metrology unit 160 all move at the same velocity, represented by $v_1$ in FIG. 2A, and by the same amount, represented by $x_1$ in FIG. 2A, along axis 180 during the ballizing process. System 100 is further configured to terminate the ballizing process once ballizing unit 110 has pushed ballizing member 130 through the entire length of workpiece bore hole 137.

In one embodiment, bottom surface 123 of ballizing pusher 116 is configured with a slight curvature (i.e., bottom surface 123 is "radiused") such that the curvature of ballizing member 130 aligns with the curvature of bottom surface 123. This alignment of curvatures facilitates the alignment of workpiece bore hole 137 with axis 180 at the beginning of the ballizing process when ballizing member 130 first engages workpiece 135 as previously described herein.

Also shown in FIG. 2A are exemplary distances 220 and 230 that represent the amount of plastic deformation that workpiece 135 may undergo during ballizing. As described herein, the increase in the diameter of workpiece bore hole 137 is equal to the sum of distances 220 and 230.

Figure 2B:
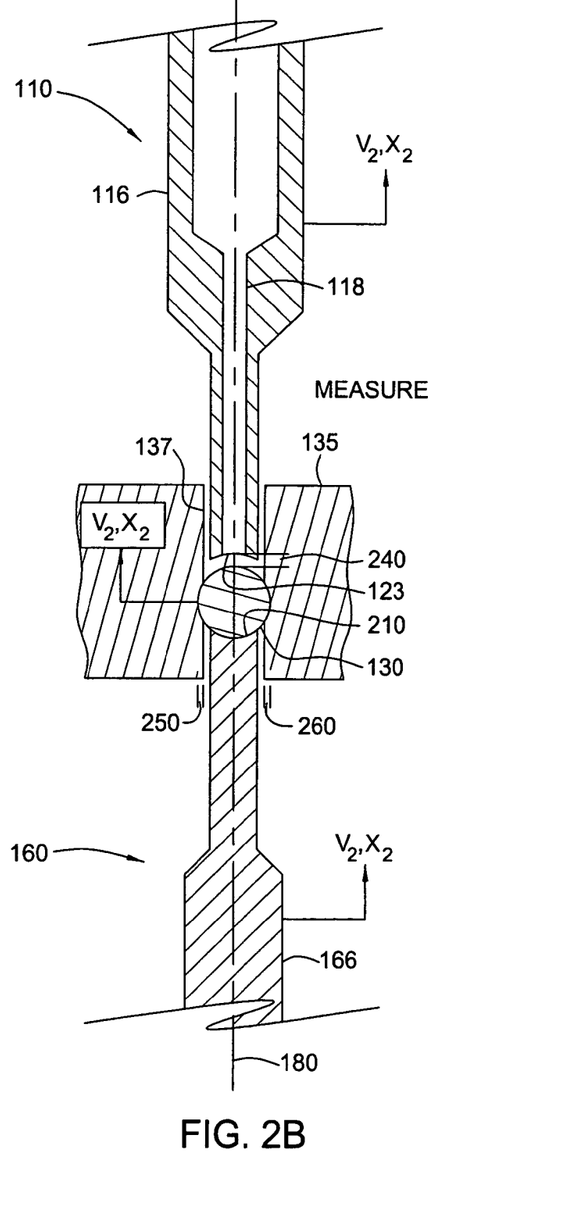
FIG. 2B is a cross-sectional view illustrating the configuration of the ballizing member, the workpiece, the ballizing pusher and the metrology pusher of FIG. 1 when measuring the workpiece bore hole, according to one embodiment of the invention.

FIG. 2B is a cross-sectional view illustrating the configuration of ballizing member 130, workpiece 135, ballizing pusher 116 and metrology pusher 166 of FIG. 1 when measuring workpiece bore hole 137, according to one embodiment of the invention. As described herein, system 100 is configured such that metrology unit 160 moves along axis 180 and engages ballizing member 130 once the ballizing process has terminated. As shown, top surface 210 of metrology pusher 166 is configured with a slight curvature (i.e., top surface 210 is "radiused") such that the curvature of ballizing member 130 aligns with the curvature of top surface 210. This alignment of curvatures facilitates the alignment of workpiece bore hole 137 with axis 180 at the beginning of the measuring process. In one embodiment, a combination of gravity and the reaction force that workpiece 135 exerts on ballizing member 130 during measuring secures ballizing member 130 against top surface 210 during the measuring process.

When the vacuum stops exerting the vacuum force, $F_v$, on ballizing member 130, ballizing unit 110 disengages ballizing member 130 and moves along axis 180 until bottom surface 123 of ballizing pusher 116 is a distance 240 from the top surface of ballizing member 130. Once ballizing unit 110 is in place, metrology unit 160 and ballizing unit 110 move upward along axis 180 in tandem such that distance 240 is maintained between bottom surface 123 and the top surface of ballizing member 130 while metrology unit 160 pushes ballizing member 130 through the length of workpiece bore hole 137. A consequence of this dynamic is that metrology unit 160, ballizing member 130 and ballizing unit 110 all move at the same velocity, represented by $v_2$ in FIG. 2B, and by the same amount, represented by $x_2$ in FIG. 2B, along axis 180 during the measuring process. System 100 is further configured to terminate the measuring process once metrology unit 160 has pushed ballizing member 130 up through the entire length of workpiece bore hole 137.

Also shown in FIG. 2B are exemplary distances 250 and 260 representing the amount of elastic deformation that workpiece 135 may undergo during measuring. As described herein, in one embodiment, the total amount of elastic deformation, the sum of distances 250 and 260, is related to the force that ballizing member 130 exerts on workpiece 135 (and the reaction force that workpiece 135 exerts on ballizing member 130) at a given position along the length of workpiece bore hole 137 and the ballized diameter of workpiece bore hole 137 at that position.

Figure 3:
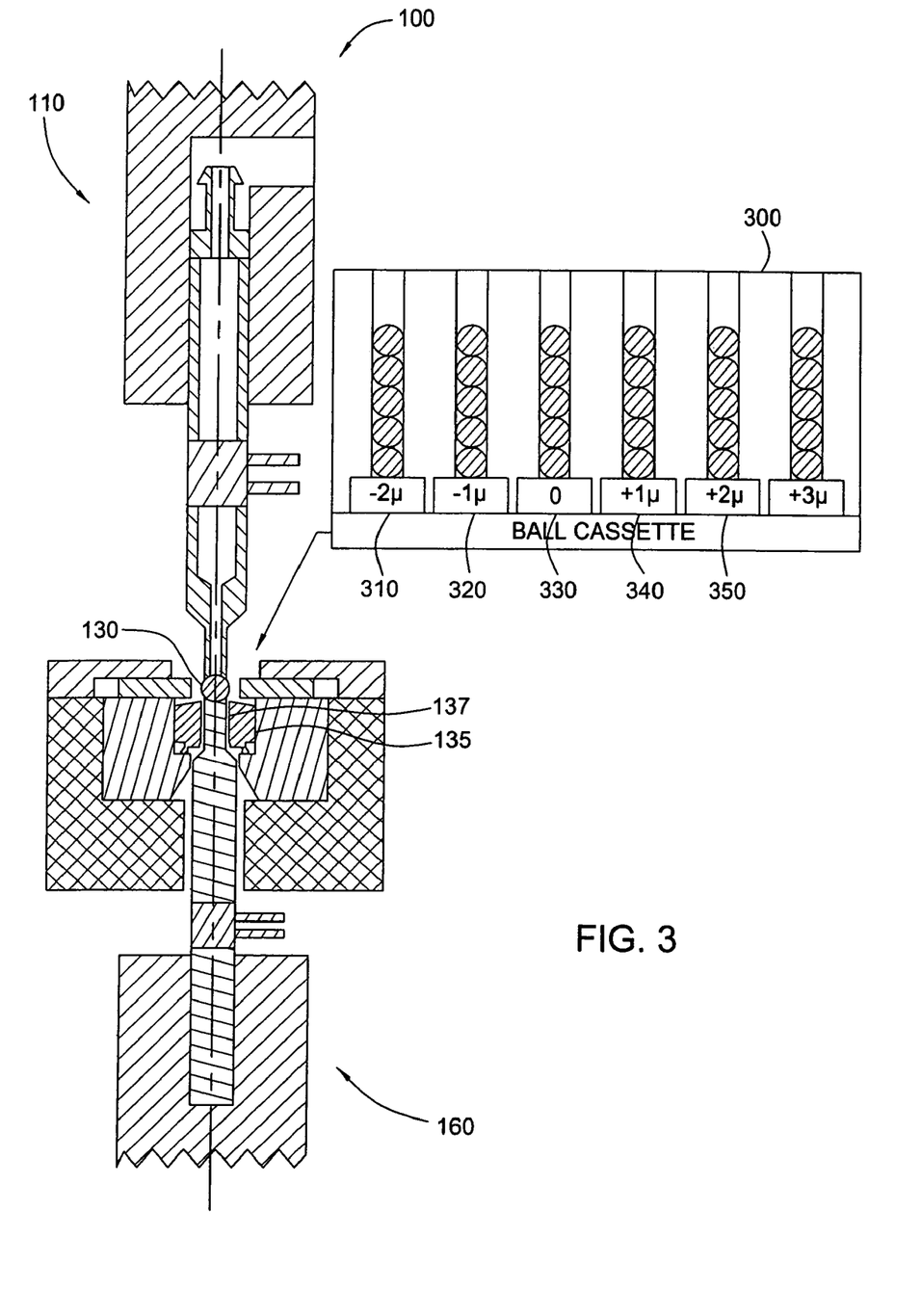
FIG. 3 illustrates the use of a ball cassette in conjunction with the system of FIG. 1 to rework the diameter of the workpiece bore hole, according to one embodiment of the invention.

FIG. 3 illustrates the use of a ball cassette 300 in conjunction with system 100 of FIG. 1 to rework the diameter of workpiece bore hole 137, according to one embodiment of the invention. As shown, ball cassette 300 includes, without limitation, several sets of balls 130, each set having a different diameter. In one embodiment, ball cassette 300 includes six sets of balls 130, each set containing balls 130 with diameters that are one micron greater than the diameters of balls 130 in the set immediately to the left.

In a rework process, system 100 first is used to ballize workpiece 135 with a first ballizing member 130. As previously described, the size of first ballizing member 130 may be based on the diameter of workpiece bore hole 137. For example, the size of first ballizing member 130 may be based on the machined diameter of workpiece bore hole 137. System 100 also is used to measure the resulting diameter of workpiece bore hole 137. If the diameter of workpiece bore hole 137 is within a desired range, the ballizing and measuring processes are terminated and workpiece 135 is removed from system 100. If, however, the diameter of workpiece bore hole 137 is smaller than the smallest diameter in the desired range, system 100 may be used to ballize workpiece 135 a second time using a second ballizing member 130.

The diameter of second ballizing member 130 is slightly larger than the diameter of first ballizing member 130. For example, if first ballizing member 130 is from a set 330, second ballizing member 130 may be from a set 340, which contains balls 130 with diameters one micron larger than those of balls 130 in set 330, or from a set 350, which contains balls 130 with diameters two microns larger than those of balls 130 in set 330. Similarly, if first ballizing member 130 is from a set 310, second ballizing member 130 may be from set 330, which contains balls 130 with diameters two microns larger than those of balls 130 in set 310, or from set 340, which contains balls 130 with diameters three microns larger than those of balls 130 in set 310.

System 100 again is used to measure the resulting diameter of workpiece bore hole 137. If the diameter of workpiece bore hole 137 is within the desired range, the ballizing and measuring processes are terminated and workpiece 135 is removed from system 100. If, however, the diameter of workpiece bore hole 137 remains smaller than the smallest diameter in the desired range, system 100 is used to ballize workpiece 135 yet again using a third ballizing member 130. Similar to before, the diameter of third ballizing member 130 is slightly larger than the diameter of second ballizing member 130. As persons skilled in the art will recognize, the ballizing and measuring processes described herein are used until the measured diameter of workpiece bore hole 137 is within the desired range.

Figure 4:
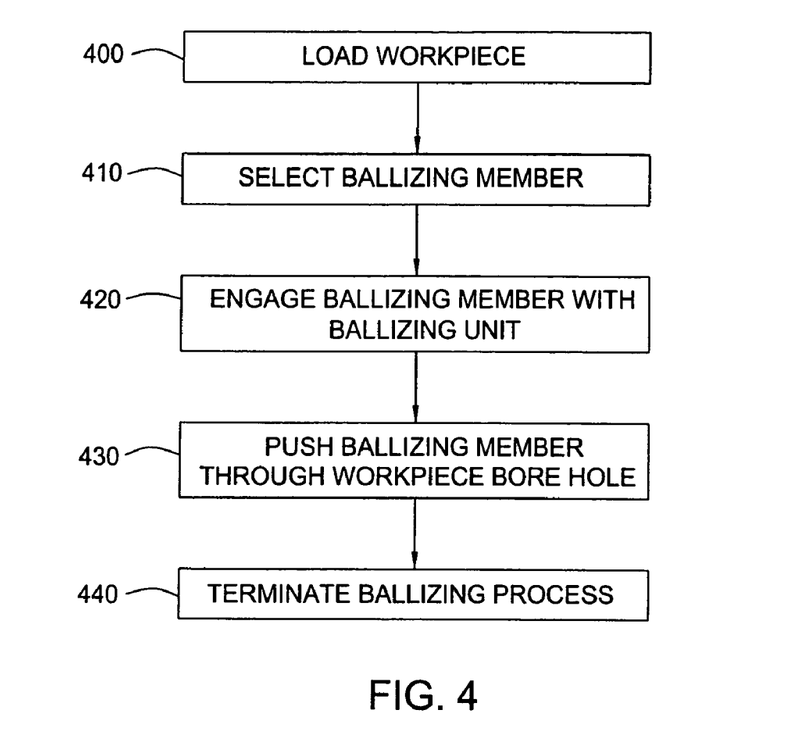
FIG. 4 shows a flow chart of method steps for ballizing a workpiece bore hole, according to one embodiment of the invention.

FIG. 4 shows a flow chart of method steps for ballizing workpiece bore hole 137, according to one embodiment of the invention. Although the method steps are described in the context of the systems illustrated in FIGS. 1-3, any system configured to perform the method steps is within the scope of the invention.

As shown in FIG. 4, the method of ballizing workpiece bore hole 137 starts in step 400 where workpiece 135 is loaded into system 100 such that workpiece 135 is placed in nest 146. In step 410, an appropriately sized ballizing member 130 is selected based on, for example, the size of the machined diameter of workpiece bore hole 137.

In step 420, ballizing unit engages ballizing member 130. In one embodiment, a vacuum exerts a vacuum force, $F_v$, on ballizing member 130 via vacuum port 118 that securely holds ballizing member 130 against a bottom surface 123 of ballizing pusher 116. Further, the curvature of bottom surface 123 aligns with the curvature of the top surface ballizing member 130. This alignment facilitates the aligning of ballizing member 130 with axis 180.

In step 430, ballizing unit 110 moves downward along axis 180, forcing ballizing member 130 down through the top part of workpiece bore hole 137. If ballizing member 130 is sized properly, the diameter of ballizing member 130 is slightly greater than the diameter of workpiece bore hole 137. The difference in diameters causes ballizing member 130 to exert a force on workpiece 135 as ballizing unit 110 pushes ballizing member 130 through the length of workpiece bore hole 137. This force causes workpiece 135 to undergo local plastic and elastic deformation in the vicinity of workpiece bore hole 137 along the entire length of workpiece bore hole 137. The diameter of workpiece bore hole 137 increases as a result of the local plastic deformation.

In step 440, system 100 terminates the ballizing process once ballizing unit 110 has pushed ballizing member 130 through the entire length of workpiece bore hole 137.

Figure 5:
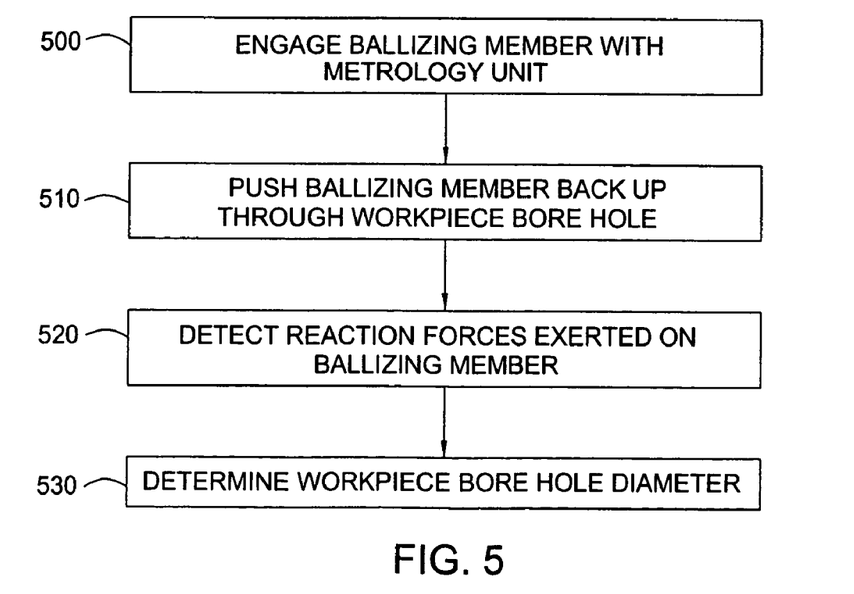
FIG. 5 shows a flow chart of method steps for measuring the diameter of a ballized workpiece bore hole, according to one embodiment of the invention.

FIG. 5 shows a flow chart of method steps for measuring the diameter of ballized workpiece bore hole 137, according to one embodiment of the invention. Although the method steps are described in the context of the systems illustrated in FIGS. 1-3, any system configured to perform the method steps is within the scope of the invention.

As shown in FIG. 5, the method of measuring the diameter of workpiece bore hole 137 starts in step 500 where metrology unit 160 engages ballizing member 130. In one embodiment, metrology unit 160 engages ballizing member 130 after the ballizing process has terminated and ballizing unit 110 has disengaged ballizing member 130. In one embodiment, a combination of gravity and the reaction force that workpiece 135 exerts on ballizing member 130 during measuring secures ballizing member 130 against top surface 210 during the measuring process. Further, the curvature of top surface 210 of metrology pusher 166 aligns with the curvature of the bottom surface of ballizing member 130. This alignment facilitates the aligning of ballizing member 130 with axis 180.

In step 510, metrology unit 160 moves upward along axis 180, forcing ballizing member 130 back up through the bottom part of workpiece bore hole 137. If ballizing member 130 is sized properly, the diameter of ballizing member 130 is slightly greater than the diameter of ballized workpiece bore hole 137. The difference in diameters causes ballizing member 130 to exert a force on workpiece 135 as metrology unit 160 pushes ballizing member 130 up through the length of workpiece bore hole 137. This force causes workpiece 135 to undergo local elastic deformation in the vicinity of workpiece bore hole 137 along the entire length of workpiece bore hole 137 (i.e., the diameter of workpiece bore hole 137 increases elastically).

In step 520, sensor 164 detects the reaction force that workpiece 135 exerts on ballizing member 130 and transmits a signal to processor 190 derived from this reaction force. In step 530, processor 190 determines the diameter of workpiece bore hole 137. As previously described, experimentation has shown that the ballized diameter of workpiece bore hole 137 is a function of the reaction force exerted on ballizing member 130 by workpiece 135. Processor 190 is configured to determine the diameter of workpiece bore hole 137 at various positions along the length of workpiece bore hole 137 using this relationship and the information contained in the signal received from sensor 164. In one embodiment, processor 190 is configured to sample the signal transmitted by sensor 164 at a rate of 1000 Hz.

Figure 6:
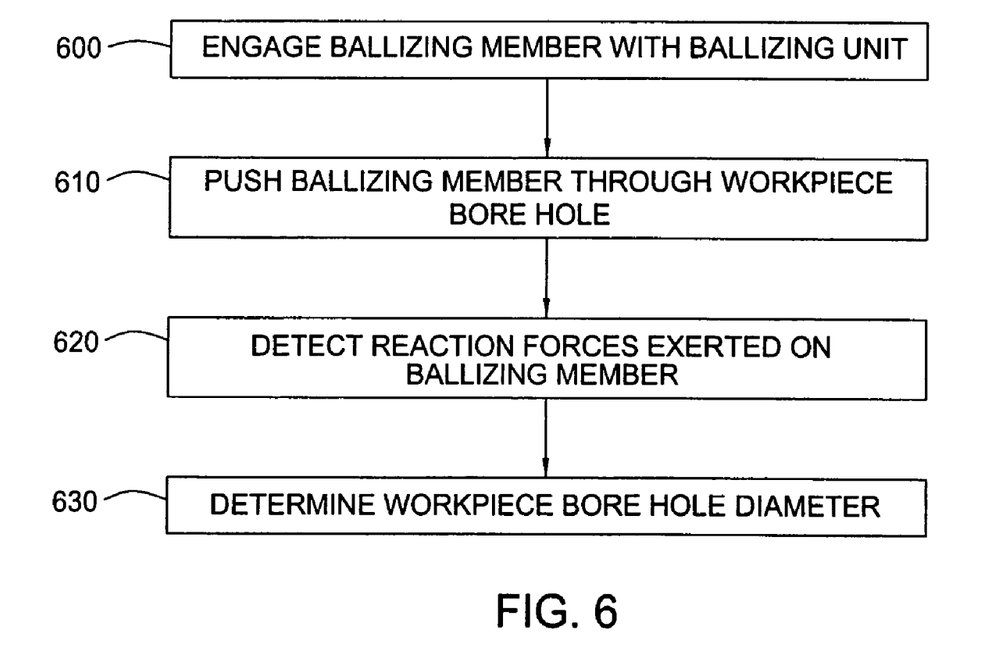
FIG. 6 shows a flow chart of method steps for measuring the diameter of a ballized workpiece bore hole, according to an alternative embodiment of the invention.

FIG. 6 shows a flow chart of method steps for measuring the diameter of ballized workpiece bore hole 137, according to an alternative embodiment of the invention. Although the method steps are described in the context of the systems illustrated in FIGS. 1-3, any system configured to perform the method steps is within the scope of the invention.

As shown in FIG. 6, the method of measuring the diameter of workpiece bore hole 137 starts in step 600 where ballizing unit 110 engages ballizing member 130. In one embodiment, a vacuum exerts a vacuum force, $F_v$, on ballizing member 130 via vacuum port 118 that securely holds ballizing member 130 against a bottom surface 123 of ballizing pusher 116. Further, the curvature of bottom surface 123 aligns with the curvature of ballizing member 130. This alignment facilitates the aligning of ballizing member 130 with axis 180.

In step 610, ballizing unit 110 moves downward along axis 180, forcing ballizing member 130 down through the top part of workpiece bore hole 137. As previously explained, if ballizing member 130 is sized properly, the diameter of ballizing member 130 is slightly greater than the diameter of workpiece bore hole 137. The difference in diameters causes ballizing member 130 to exert a force on workpiece 135 as ballizing unit 110 pushes ballizing member 130 through the length of workpiece bore hole 137. This force causes workpiece 135 to undergo local plastic and elastic deformation in the vicinity of workpiece bore hole 137 along the entire length of workpiece bore hole 137. The diameter of workpiece bore hole 137 increases as a result of the local plastic deformation.

In step 620, sensor 120 detects the reaction force that workpiece 135 exerts on ballizing member 130 and transmits a signal to processor 190 derived from this reaction force. In step 630, processor 190 determines the diameter of workpiece bore hole 137. As previously described, experimentation has shown that the ballized diameter of workpiece bore hole 137 is a function of the reaction force exerted on ballizing member 130 by workpiece 135. Processor 190 is configured to determine the diameter of workpiece bore hole 137 at various positions along the length of workpiece bore hole 137 using this relationship and the information contained in the signal received from sensor 120. In one embodiment, processor 190 is configured to sample the signal transmitted by sensor 120 at a rate of 1000 Hz.

Figure 7:
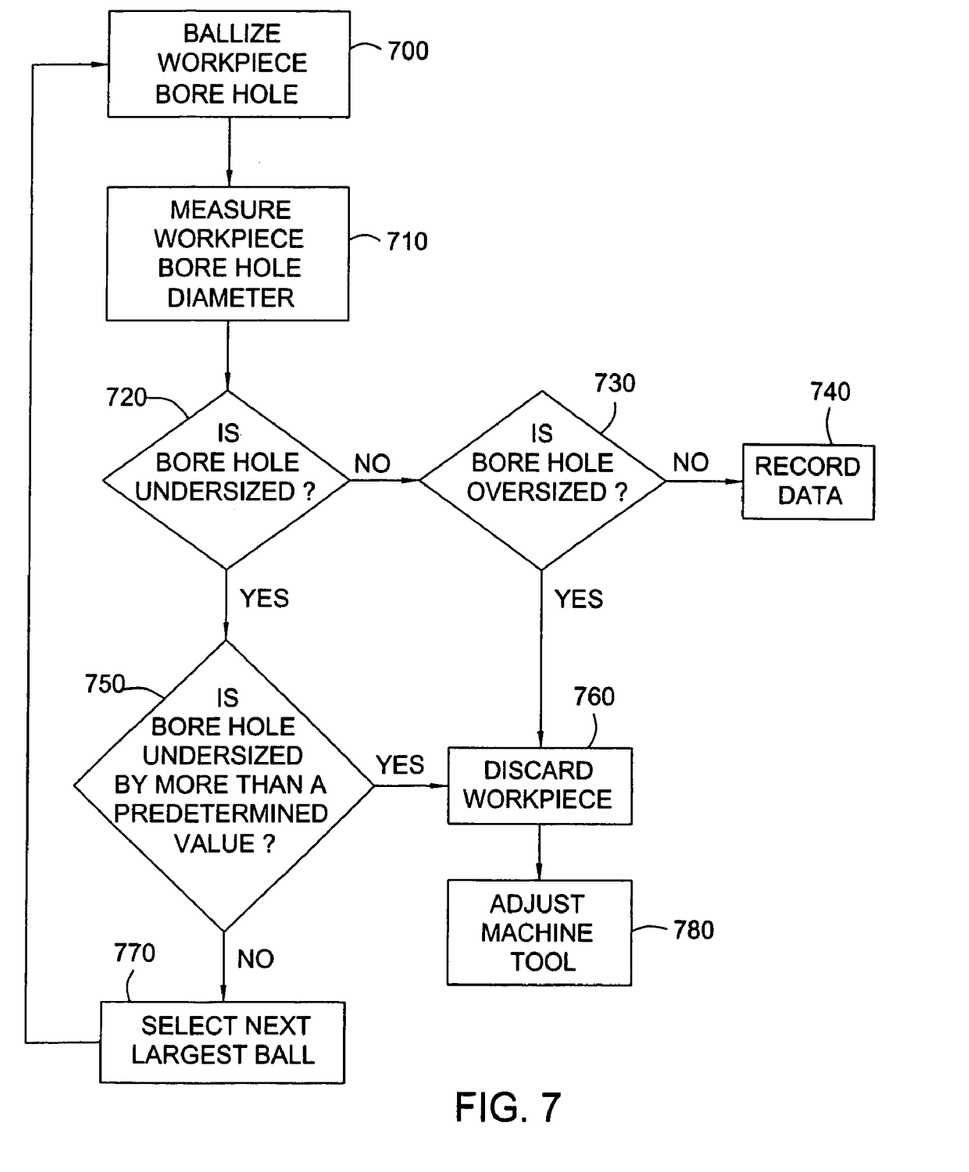
FIG. 7 shows a flow chart of method steps for processing and disposing of a workpiece, according to one embodiment of the invention.

FIG. 7 shows a flow chart of method steps for processing and disposing of workpiece 135, according to one embodiment of the invention. Although the method steps are described in the context of the systems illustrated in FIGS. 1-3, any system configured to perform the method steps is within the scope of the invention.

As shown in FIG. 7, the method of reworking or discarding starts in step 700 where system 100 is used to ballize workpiece bore hole 137 as described herein. In step 710, system 100 is used to measure the diameter of ballized workpiece bore hole 137 as described herein. In step 720, system 100 is configured to determine whether the diameter of workpiece bore hole 137 is undersized. In one embodiment, processor 190 is configured to compare the measured diameter of workpiece bore hole 137 with the smallest diameter in a desired range of diameters and to determine whether the measured diameter is greater or less than this smallest diameter. If the measured diameter of workpiece bore hole 137 is greater than the smallest diameter, then workpiece bore hole 137 is not undersized, and the method proceeds to step 730. In step 730, system 100 is configured to determine whether the diameter of workpiece bore hole 137 is oversized. In one embodiment, processor 190 is configured to compare the measured diameter of workpiece bore hole 137 with the largest diameter in the desired range of diameters and to determine whether the measured diameter is greater or less than this largest diameter. If the measured diameter of workpiece bore hole 137 is less than the largest diameter, then workpiece bore hole 137 is not oversized. Next, in step 740, system 100 is configured to record the diameter of workpiece bore hole 137, indicating that workpiece 135 is usable. In one embodiment, processor 190 is configured to record the diameter data. If, however, the measured diameter of workpiece bore hole 137 is greater than the largest diameter, then workpiece bore hole 137 is oversized. Next, in step 760, system 100 is configured to discard workpiece 135, indicating that workpiece 135 is unusable. Then, in step 780, the machine tool used to machine workpiece bore hole 137 is adjusted to decrease the machined diameter of workpiece bore hole 137. In one embodiment, processor 190 is configured to transmit a signal to the machine tool that causes the machine tool to adjust automatically the machined diameter of workpiece bore hole 137.

Referring back to step 720, if the measured diameter of workpiece bore hole 137 is less than the smallest diameter in the desired range, then workpiece bore hole 137 is undersized, and the method proceeds to step 750. In step 750, system 100 is configured to determine whether the diameter of workpiece bore hole 137 is undersized by more than a predetermined value. In one embodiment, processor 190 is configured to compare the difference between the smallest diameter in the desired range and the measured diameter of workpiece bore hole 137 with the predetermined value and to determine whether the difference is greater or less than the predetermined value. If the difference is greater than the predetermined value, then the diameter of workpiece bore hole 137 is undersized by more than the predetermined value.

Next, in step 760, system 100 is configured to discard workpiece 135, indicating that workpiece 135 is unusable. Then, in step 780, the machine tool used to machine workpiece bore hole 137 is adjusted to increase the machined diameter of workpiece bore hole 137. In one embodiment, processor 190 is configured to transmit a signal to the machine tool that causes the machine tool to adjust automatically the machined diameter of workpiece bore hole 137. If the difference is less than the predetermined value, then the diameter of workpiece bore hole 137 is not undersized by more than the predetermined value. Next, in step 770, system 100 is configured to select the next largest ball from ball cassette 300, and the method returns to step 700. In one embodiment, the predetermined value is one micron.

Those skilled in the art will recognize that system 100 may be configured to perform numerous functions based on the measured diameter of workpiece bore hole 137 other than those set forth above. For example, in an alternative embodiment, instead of discarding workpiece 135 as set forth in step 760, system 100 may be configured to transfer ballized workpiece 135 to a sorting bin where workpiece 135 may be matched with an appropriately sized corresponding part to create a highly controlled gap between workpiece 135 and the corresponding part. Further, in other embodiments, system 100 may be configured such that the step of adjusting the machine tool used to machine workpiece bore hole 137 as set forth in step 780 is skipped all together regardless of whether workpiece 135 is discarded or transferred to a sorting bin. In another alternative embodiment, system 100 may be configured to measure and to record the diameter of workpiece bore hole 137 and to transfer workpiece 135 to a sorting bin once workpiece 135 is ballized, regardless of the size of the ballized diameter of workpiece bore hole 137. In yet another alternative embodiment, system 100 may be configured simply to measure and to record the diameter of workpiece bore hole 137 once workpiece 135 is ballized.

One advantage of system and method described above is that, among other things, system 100 provides a cost effective way to produce workpiece bore holes 137 that have very precise diameters, high quality surface finishes and better shaped circumferences. Further, the high precision of the ballizing process associated with system 100 reduces the standard deviation associated with the diameter of workpiece bore hole 137. Another advantage of system 100 is that it provides a way to measure and record the diameter of ballized workpiece bore hole 137 without having to remove workpiece 135 from system 100 and to send workpiece 135 to a metrology lab for measuring. This feature greatly reduces the time and cost associated with machining high precision workpiece bore holes 137. Yet another advantage is that system 100 provides a simple way to return ballizing member 130 to the upper side of workpiece 135 once ballizing member 130 has been pushed through the length of the workpiece bore hole 137.

The invention has been described above with reference to specific embodiments. Persons skilled in the art, however, will understand that various modifications and changes may be made thereto without departing from the broader spirit and scope of the invention as set forth in the appended claims. For example, in alternative embodiments, any of the steps described above for ballizing or measuring, such as loading workpiece 135, selecting ballizing member 130 or loading ballizing member 130, may be automatically performed by one or more elements of system 100 or may be performed by an individual operator. The foregoing description and drawings are, accordingly, to be regarded in an illustrative rather than a restrictive sense.

What is claimed is:

1. A system for ballizing, and measuring a diameter of, a bore hole of a workpiece, the system comprising:
    a ballizing unit having a ballizing pusher with a distal end capable of being removably coupled to a ballizing member, the ballizing unit configured to move the ballizing member along an axis from a first position within the bore hole to a second position within the bore hole;
    a metrology unit having a metrology pusher with a distal end capable of being removably coupled to the ballizing member, the metrology unit configured to move the ballizing member along the axis from the second position to the first position;
    and a sensor coupled to the metrology pusher and configured to detect, as the metrology unit moves the ballizing member from the second position to the first position, a force exerted on the ballizing member by the workpiece at a third position within the bore hole, the third position being disposed between the second position and the first position.

2. The system of claim 1, further comprising a processor configured to determine from the force the diameter of the bore hole at the third position.

3. The system of claim 1, further comprising a ball cassette configured to supply the ballizing member.

4. The system of claim 1, further comprising a platform unit having a nest and including a workpiece retainer, the workpiece retainer configured to hold the ballizing unit within the nest while the metrology unit moves the ballizing member from the second position to the first position.

5. The system of claim 1, wherein the ballizing unit and the metrology unit are disposed at opposite ends of the bore hole of the workpiece, each of the ballizing unit and the metrology unit configured to move the ballizing member by exerting a pushing force on the ballizing member.

6. A system for ballizing, and estimating a diameter of, a bore hole of a workpiece, the system comprising:
    a ballizing unit having a ballizing pusher with a distal end capable of being removably coupled to a ballizing member, the ballizing unit configured to move the ballizing member along an axis from a first position within the bore hole to a second position within the bore hole;
    a cassette comprising a plurality of differently-sized ballizing members, from which the ballizing member can be selected by the ballizing unit;
    a sensor coupled to the ballizing pusher and configured to detect, as the ballizing unit moves the ballizing member from the first position to the second position, a force exerted on the ballizing member; and
    a processor configured to receive information representative of the force exerted and to cause selection of a second ballizing member for another cycle of ballizing by estimating the diameter from the force information and comparing the estimated diameter to a desired diameter.

7. The system of claim 6, wherein the ballizing unit comprises a vacuum producing portion operable to draw the ballizing member from the cassette into coupling with the ballizing pusher.

8. The system of claim 6, wherein the ballizing unit further comprises a vacuum port for applying vacuum to the ballizing member.

9. The system of claim 6, wherein the ballizing unit comprises a nest and further comprising a workpiece retainer.

* * * * *